Sept. 22, 1959     F. B. CALLANEN ET AL     2,905,451
MIXING DEVICE
Filed March 28, 1958     6 Sheets-Sheet 1

INVENTORS.
FREDERICK B. CALLANEN
BY BRUCE K THOMAS
Edward H. Fang
ATTORNEY

INVENTORS.
FREDERICK B. CALLANEN
BRUCE K THOMAS
BY
ATTORNEY

Sept. 22, 1959     F. B. CALLANEN ET AL     2,905,451

MIXING DEVICE

Filed March 28, 1958     6 Sheets-Sheet 3

INVENTORS.
FREDERICK B. CALLANEN
BRUCE K THOMAS
BY
Edward H. Lang
ATTORNEY

Sept. 22, 1959    F. B. CALLANEN ET AL    2,905,451
MIXING DEVICE
Filed March 28, 1958    6 Sheets-Sheet 4
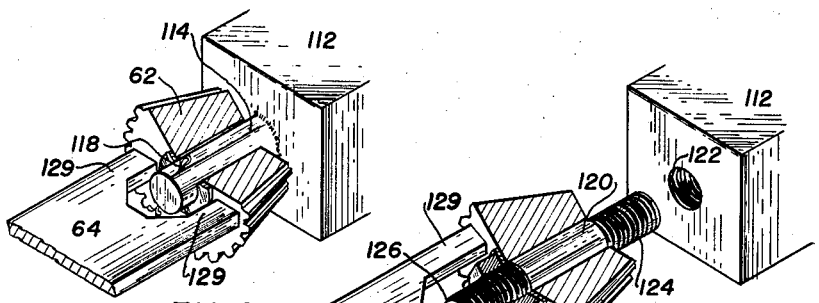
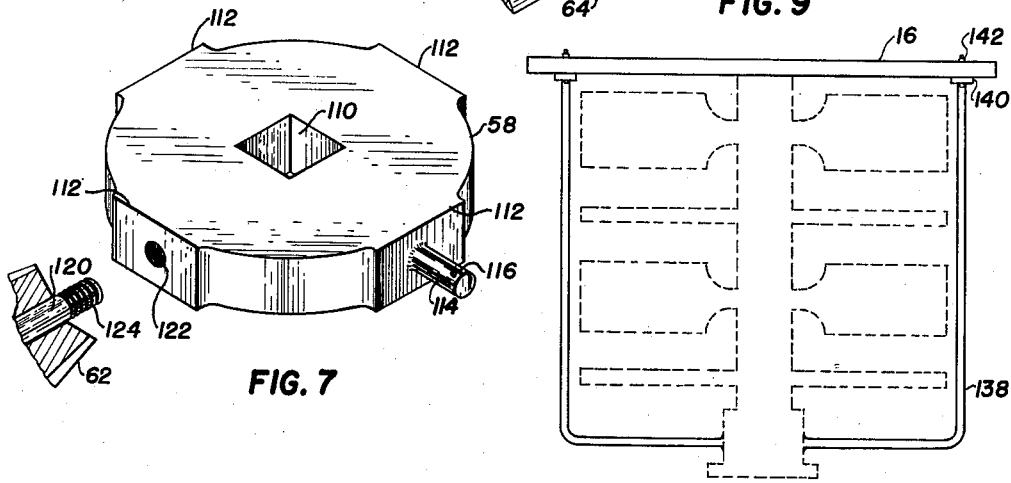
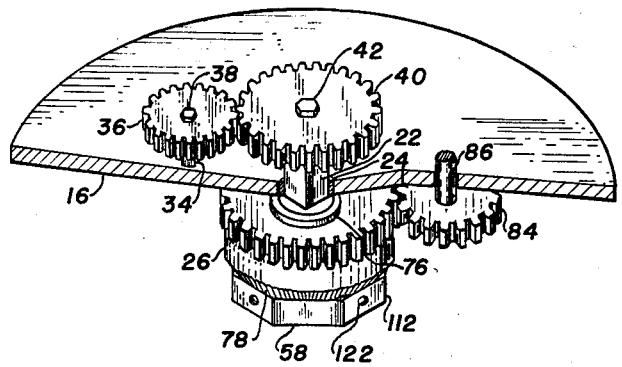
INVENTORS.
FREDERICK B. CALLANEN
BY BRUCE K THOMAS
Edward H. Lang
ATTORNEY Sept. 22, 1959 F. B. CALLANEN ET AL 2,905,451
MIXING DEVICE
Filed March 28, 1958 6 Sheets-Sheet 5

INVENTORS.
FREDERICK B. CALLANEN
BY BRUCE K THOMAS
Edward H. Lang
ATTORNEY

Sept. 22, 1959   F. B. CALLANEN ET AL   2,905,451
MIXING DEVICE

Filed March 28, 1958   6 Sheets-Sheet 6

INVENTORS.
FREDERICK B. CALLANEN
BY BRUCE K. THOMAS
Edward H. Lang
ATTORNEY

# United States Patent Office 2,905,451
Patented Sept. 22, 1959

2,905,451

MIXING DEVICE

Frederick B. Callanen, Northfield, and Bruce K. Thomas, Glencoe, Ill., assignors to The Pure Oil Company, Chicago, Ill., a corporation of Ohio Application March 28, 1958, Serial No. 724,582

13 Claims. (Cl. 259—102)

The present invention relates to a mixing device designed for service under a wide variation of sheer, load and speed requirements which is characterized by providing means to rotate a series of spaced cooperating impeller blades interconnected through an epicyclic gear train about a rotatable supporting shaft with a combination of means to cause the blades to rotate simultaneously about or with the supporting shaft and individually on axes vertical to the shaft.

Various designs of counter-rotating blades are known in the art, including concentric opposite rotating shafts wherein the counter-rotation is limited to the locale of the shaft ends, and embodiments wherein the counter-rotation is between vertically suspended blades and a rotating container wall. In still another type of mixer, counter-rotation is accomplished by suspending alternate blades on independent cooperating shaft and bracket arrangements. Double motion agitators are known and used as pressure mixers and grease mixers, embodying outer sweep and scraper arms rotating in one direction and alternate paddles revolving in the opposite direction. It is also known to arrange the paddles so that one set is pitched to lift the materials being mixed while the other set is pitched to force the materials downwardly. As the paddles pass each other, they cooperate to produce a rubbing, kneading, and shearing action which effectuates thorough mixing and homogeneity of product. The efficiency of heating or cooling action is also accelerated by these prior art designs. However, so far as it is known, none of the prior art mixers provide counter-agitation under conditions wherein a plurality of blades extending from a first axis are caused to rotate in the same or opposite directions about that first axis, while at the same time each individual blade is rotating about a second axis vertical to said first axis. Further, the prior art mixers do not provide an assembly of cooperating blades wherein the number of agitators may be readily varied or their respective alternate speeds of rotation and blade distances changed or varied over considerable ranges to provide direct control of the degree of shear therebetween without turning to a completely different assembly or without complex mechanical changes.

In one embodiment the present invention comprises a device providing a series of alternate counter-rotating agitator blades or impellers mounted so that shear is produced between adjacent edges which are also rotating about a single rotatable shaft driven by separate sources of motive power.

In another embodiment, this invention provides a series of spaced, matched, interchangeable collars each carrying a plurality of individually rotatable impeller blades, slideably mounted on a rotatable shaft, wherein the individual blades or any one collar are rotated about their individual supporting axles in either direction, and also around the shaft by an interconnected epicyclic gear train including a series of spacer gear hubs in cooperation therewith.

In another embodiment of the invention, a combination is provided wherein at the choice of the operator a series of spaced horizontal impeller blades in a plurality of planes perpendicular to the supporting shaft may be caused to rotate about the vertical shaft only, without individual rotation, or rotate both about the shaft and individually or rotate individually only. In still another embodiment of the invention, a unitary portable mixing device is provided which may be easily assembled or disassembled for cleaning, repair or inspection of the parts, the parts are automatically lubricated by the material being worked and the number, spacing or degree of shear provided can be readily controlled. Also, the present mixing device may be readily used in both generally cylindrical mixing vessels and also confined spaces or mixing vessels wherein only one type of rotation is used as will be described.

This invention is related to application Serial Number 396,497 filed December 7, 1953, now Patent No. 2,864,594 dated Dec. 16, 1958, entitled "A Mixing Device" by Thomas W. Martinek, which employs a fixed supporting shaft and impellers that do not rotate individually. In accordance with the present invention, the supporting shaft is caused to rotate and the impellers are attached to the individual spur or bevel gears so that rotation of the shaft is at a speed greater or less than the rotation of the respective hubs in the series. This imparts to each impeller or pair of opposite impellers two types of motion. Each impeller is rotating around the supporting shaft, either slowly or at considerable speed and also each impeller is rotating individually or in multiples around its own longitudinal axis in a plane vertical to the supporting shaft. The spacing between the adjacent impeller pairs or individual impellers in the series along the length of the supporting shaft can be varied by using impellers which have different depths or by using spacing gear collars of different depths. Accordingly, the invention makes use of a true epicyclic gear train of straight, spur or bevel gear-type for connecting corresponding and matching sun gear, spur gear, or bevel gear hubs in a series with spaced independent impellers rotating along the same axial line. Each spacer has matching gear surfaces on its periphery which engage the corresponding and adjacent spur or bevel gears of the impeller hubs. Each part is designed for easy disassembly for changing the type of blade, the degree of shearing action, the number of blades or the relative speed ratio desired.

Accordingly, it is the primary object of this invention to provide a mixing device for variable, controlled degrees of agitation and shear.

A second object of this invention is to provide in a mixing device an epicyclic gear train between rotatable agitator blades supported on a rotatable shaft.

A third object of this invention is to provide an agitator blade assembly to give alternate counter-rotation in a series of individually rotating blades throughout the mixing volume employing an epicyclic gear train.

A fourth object of the invention is to provide a mechanical arrangement of interconnecting agitator blades, hubs and sun gear assemblies in a mixing device whereby efficient counter-rotation and opposed longitudinal rotation of each blade is attached, to provide uniform shear throughout the agitation volume.

A fifth object is the provision of means for varying the speed rates of one or more respective alternate horizontally and vertically rotating blades or blade groups in a mixing device.

A sixth object of the invention is to provide a mixing device which is readily dismantled, assembled, transported and repaired.

A seventh object of the invention is to provide means whereby the shearing action between the successive agitator blades may be varied or changed as the necessity therefor may be dictated by the progress of the chemical or physical action of the materials being agitated.

Other objects and advantages of the invention will become apparent as the description thereof proceeds to include gear sleeves, slideable collars for sun gears acting as hubs for the impellers, varying gear ratios between hub assemblies, readily detachable brackets, and easily removable assemblies as refinements of the differential action between assemblies about a rotatable inner shaft and by reference to the drawings wherein:

Figure 7 is an isometric view of a collar 58 showing two types of bevel spur gear mountings.

Figure 8 is a partial isometric view showing a fixed axle mounting for a spur gear.

Figure 9 is a partial isometric view of a demountable axle arrangement for a spur gear.

Figure 10 is a partial cut-away isometric view of the top gear arrangement.

Figure 14 is a side view of another unitary portable assembly with the gears, impellers and bearings shown in dotted lines with separate self-contained means to hold the bottom bearing.

Figure 1:
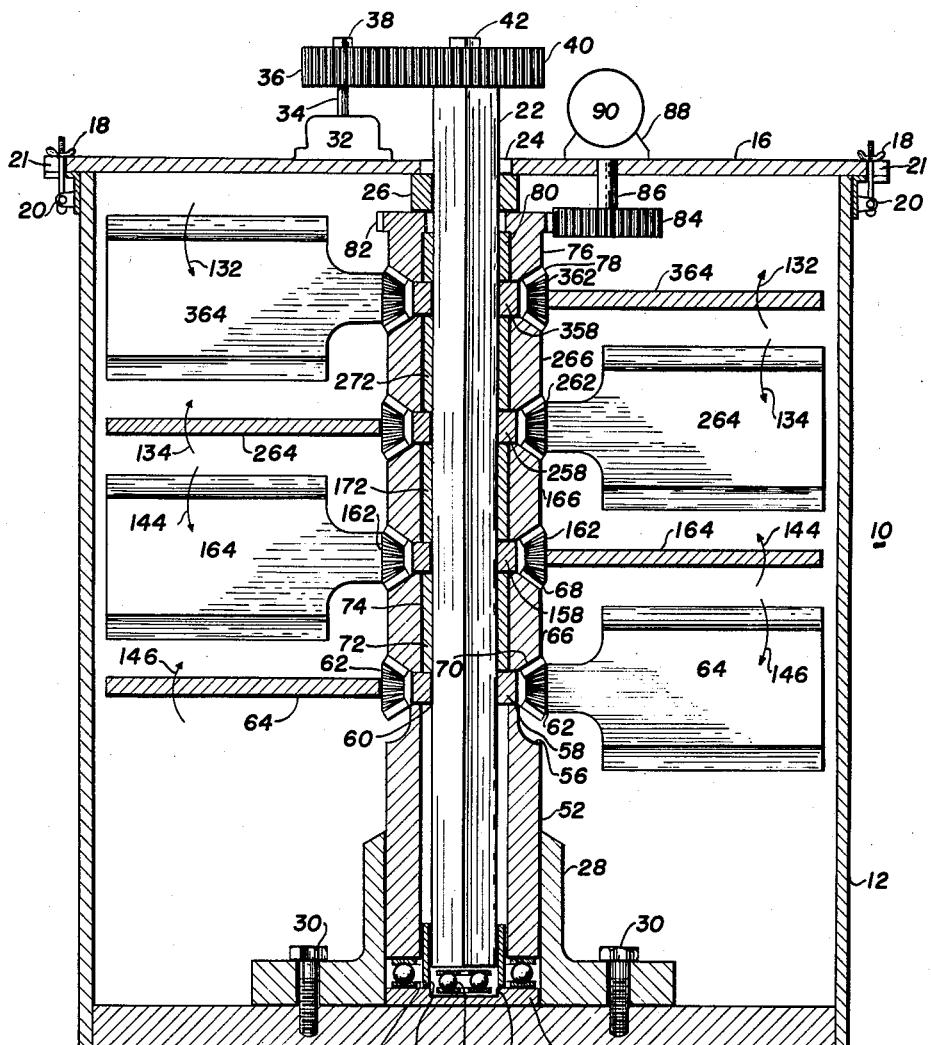
Figure 1 is a cross-sectional elevation view of a mixing vessel showing one embodiment of the invention.

Referring to the drawings, a mixing vessel 10 is shown formed by wall 12 and bottom 14. Vessel 10 may be any form of container designed to confine the materials to be mixed and would ordinarily include means for applying heat, pressure or an inert atmosphere, which means have been omitted for simplicity. Cover member 16 is held in place by swing bolts 18 attached to brackets 20 engageable within aligned peripheral slots 21 within the cover member and top portion of the brackets. Shaft 22 extends through aperture 24, through thrust bearing or thrust collar 26 to trunnion 28 held in place by bolts 30 against bottom 14. Shaft 22 is rotated by motor 32 connected through shaft 34, gear 36, held thereto by means of nut or hub member 38 and engaging gear 40. Nut or hub member 42 holds gear 40 to shaft 22.

Shaft 22 is of irregular cross-section such as square, rectangular, hexagonal, etc., or may have a key slot extending the length thereof in order that the epicyclic gear train with associated impeller blades, hubs, collars and bearings may be mounted thereon so as to either rotate with shaft 22, be independently rotatably mounted thereon, or act as supporting members. The relationship of these parts is such that their description in order of their placement in assembling the apparatus is warranted.

Figure 5:
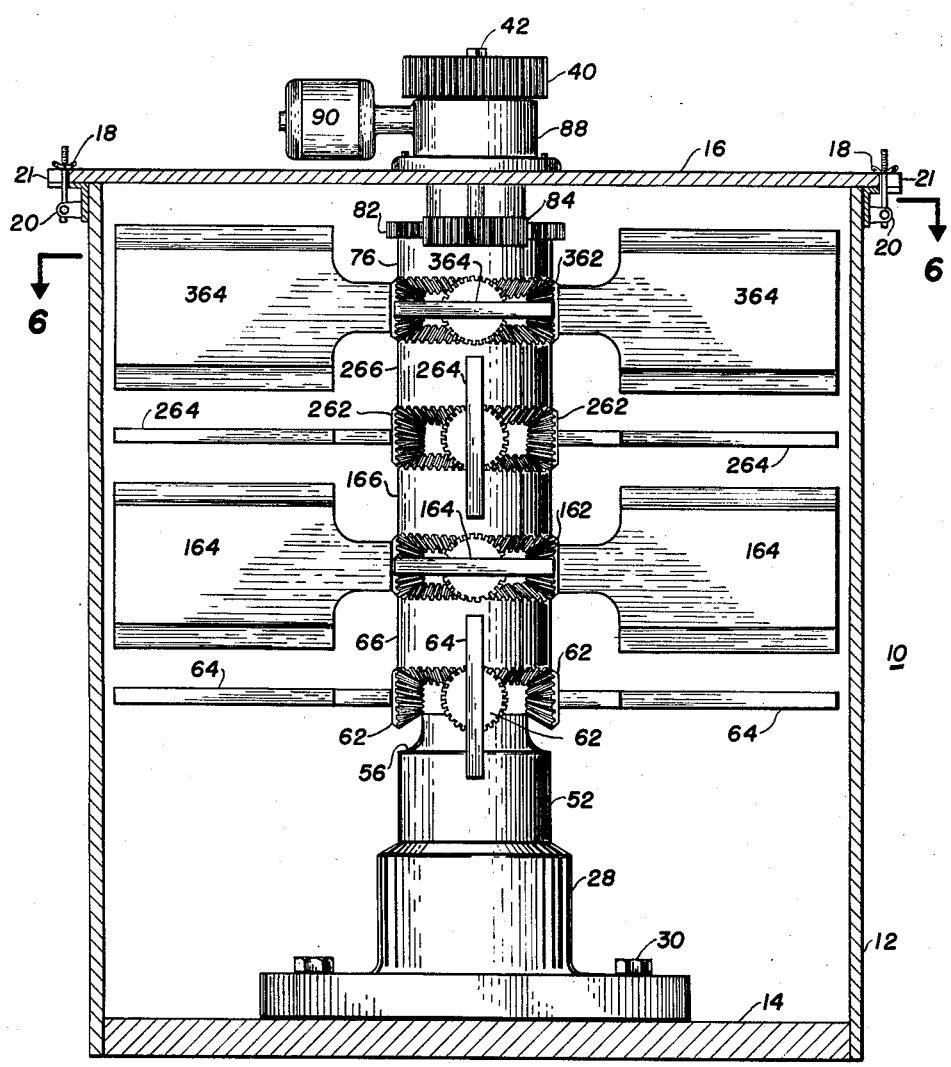
Figure 5 is a cross-sectional view of the mixing vessel of Figure 1 exposing the epicyclic gear train and impellers shown isometrically.

In the bottom bearing assembly plate 44, having central depression 46, rests within trunnion 28 on bottom 14. Depression 46 houses ball bearing 48 which supports shaft 22. A second ball bearing 50 is located on the outer shoulder of plate 44 which also supports adapter sleeve 52. Bearing sleeve 54 encompasses the end of shaft 22 and rests on the peripheral shoulder of depression 46. Adapter sleeve 52 has shoulder 56 abutting against the bottom collar 58 to support the gear train assembly within the vessel 10. Collar 58 has an inner central aperture 60 conforming to the outer shape of shaft 22, which is square in the illustrative embodiment, so that collar 58 may be dropped on the shaft and will rotate in either direction with the rotation of the shaft. Rotatably mounted and outwardly extending from collar 58 are four bevel spur gears 62 (see also Figure 5) each about 90° from each other. Each spur gear 62 carries, attached to its flat end surface, an impeller blade 64. Shaft 22 next carries a double bevel gear 66 having gear surfaces 68 and 70 cut at an angle in the peripheral corners and extending circumferentially around the shaft. Double bevel gear 68 is rotatably mounted on shaft 22 by means of sleeve bearing 72 which fits the shaft in a non-rotating relationship providing outer sliding or bearing surface 74. The next collar 158 carries spur gears 162 and impeller blades 164 in an identical arrangement engaging ring gear surface 68 of double bevel gear 66. Any number of such epicyclic gear arrangements may be assembled on shaft 22 to include double bevel gear 166, sleeve bearing 172, collar 258, bevel spur gears 262, impellers 264, sleeve bearing 272; double bevel gear 266, collar 358, bevel spur gears 362 and impellers 364. Parts bearing numbers increased by 100 consecutively are identical.

The top-most bevel gear 76 having circumferential bevel ring gear surface 78 is carried on shaft 22 by means of sleeve bearing 80, being similar to bearings 72 but of lesser depth. The outer top portion of gear 76 carries ring gear 82 which engages driving gear 84, from shaft 86 extending from gear box 88 and motor 90.

Figure 3:
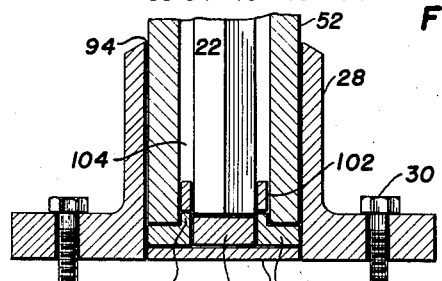
Figure 3 is a cross-sectional view of one form of base support and bearing for the vertical shaft.
Figure 2:
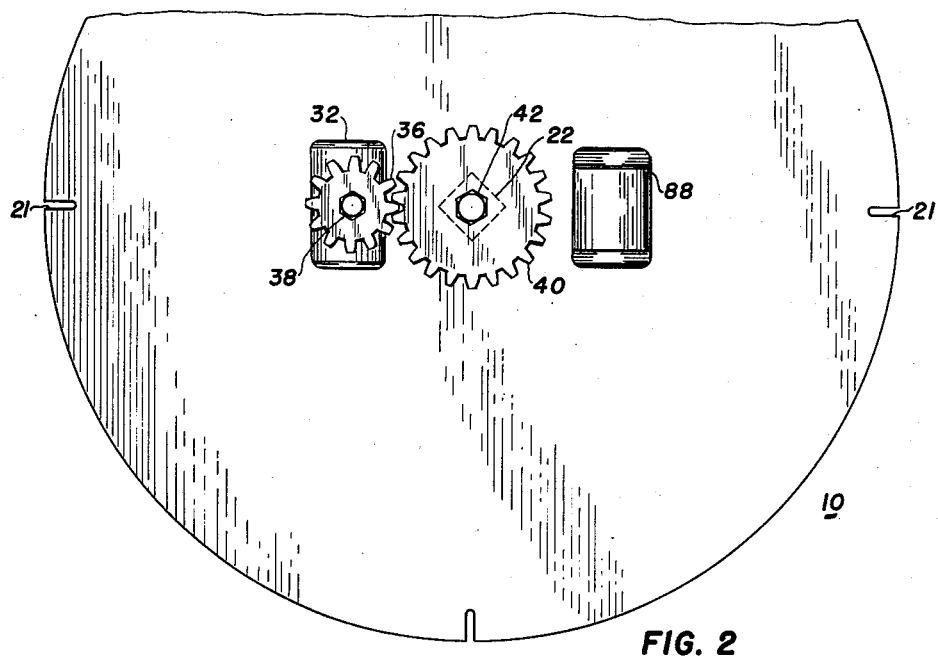
Figure 2 is a top view of the embodiment shown in Figure 1 with the cover member 16 removed so that the parts are exposed.

In Figure 3 a solid bearing arrangement within trunnion 28 is shown. Plate 92 forms a bottom support and fits within the cross-section of aperture 94 of trunnion 28. Annular retainer 96 having shoulder 98 rests on plate 92 and likewise conforms with aperture 94 and carries adapter sleeve 52. Disc 100 fits within retainer 96 forming a bearing surface for shaft 22. Bushing 102 rests on shoulders 98 and has a square aperture so that it rotates or remains stationary with shaft 22. Annular space 104 may be packed with grease or other lubricant for the bearing parts.

Figure 4:
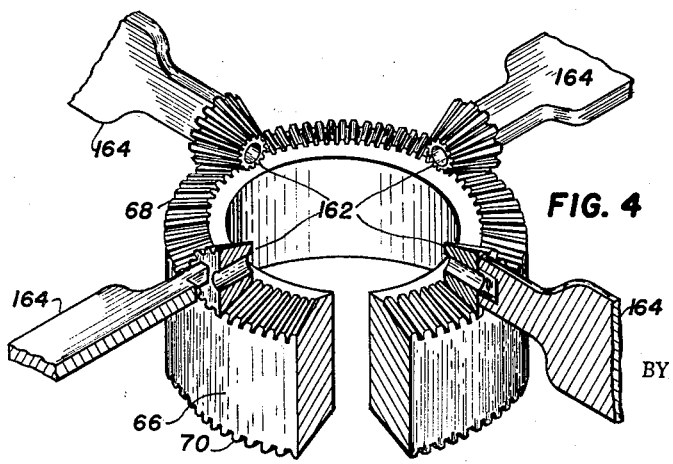
Figure 4 is an isometric view of one double bevel gear and a tier of associated spur gears carrying impeller blades.

In Figure 4 the details of a double bevel gear 66 are shown with bevel gear surfaces 68 and 70 exposed. Four spur bevel gears 162, each carrying an impeller blade 164 placed at 90° angles from one another, rotate as they travel around gear surface 68 as true epicyclic gears. Adapter 52, collar 58 and spur gears 62 along with blades 64 are omitted from Figure 4 as in the next bevel gear 166.

In Figure 7 there is shown the details of a collar 58 having square aperture 110 to fit shaft 22. Two means for attaching bevel spur gears 62 and their attached impeller blades are shown in Figure 7. Collar 58 has four shoulder projections 112 on its peripheral surface. Each of these shoulder projections may have a centrally located axle 114 extending radially therefrom having a transverse aperture 116 near its end for receiving a cotter key 118 (see Figure 8) to hold the spur gear and impeller arrangement. Each shoulder 112 may be fitted with a fixed axle 114 as shown. An alternate axle arrangement is shown at 120 wherein a threaded bore hole 122 is located in each of the shoulders 112 of collar 58. Axle 120 has threads 124 so that it may be secured within hole 122 in a non-rotating relationship with collar 58. The details are carried further in Figures 8 and 9. Axle 120 has a second thread 126 at its opposite end which is engaged by lock nut 128 to hold spur gear 62 thereon. Blades 64 are welded or otherwise attached to gears 62 through yoke members 129 which also provide space to receive the ends of shafts 114 and 120.

Figure 10 shows another view of the gear arrangement at the top of shaft 22 and carried by cover member 16 which is partially cut away. Motors 32 and 90 and also gear box 88 are omitted from Figure 10.

Figure 11:
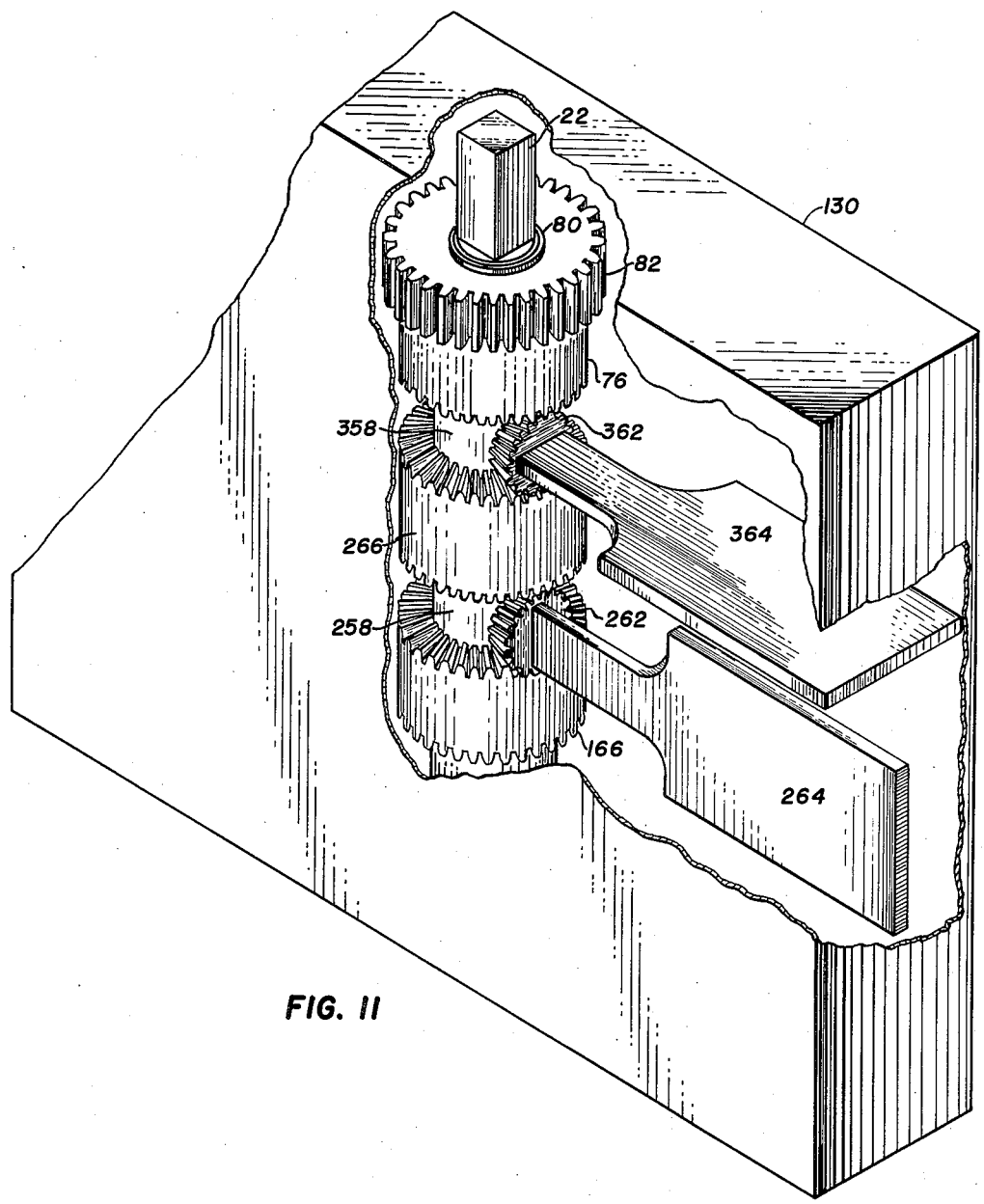
Figure 11 is an isometric view of two tiers of impeller blades on a fixed supporting shaft operating within a confined vessel.

In Figure 11 advantage is taken of a unique function of the apparatus of this invention. As one embodiment, shaft 22 may be fixed, that is, motor 32 inactivated and the device used with only motor 90 in operation. As will be demonstrated, this operation stops the horizontal circular or epicyclic travel of the impellers 64 (364 and 264 as shown) and utilizes only their individual rotation around and with their supporting spur gears and axles. With all of the collars 58 placed on shaft 22 so that the impellers are in vertical alignment, the device may operate in a confined elongated vessel 130 as indicated. For simplicity only, two tiers of impellers are shown in Figure 11.

Figure 12:
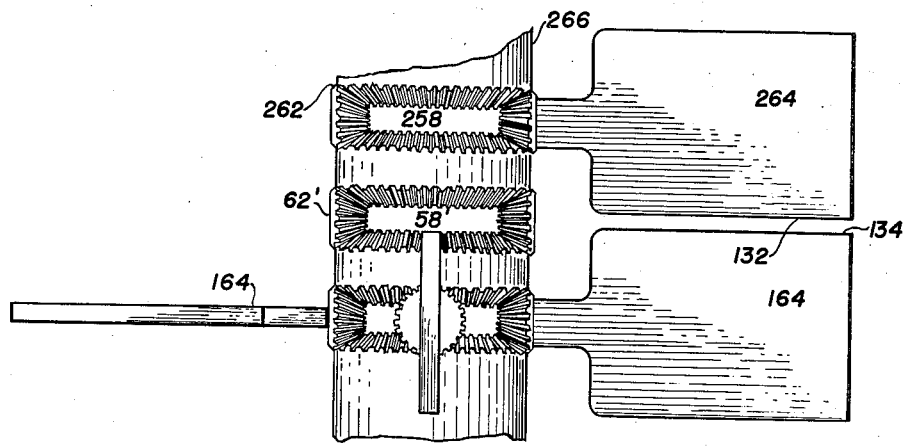
Figure 12 is an elevational view showing the use of an idler pinion arrangement placement of impeller blades so that the shear is between opposed edges thereof.

In Figure 12 another arrangement is shown wherein a spacing collar 58' is used having spur gears 62' which are not carrying impeller blades. By this arrangement the opposed adjacent edges 132 and 134 of impellers 264 and 164, respectively, are made to pass each other in opposite directions to give increased shear and at close proximity.

Figure 13:
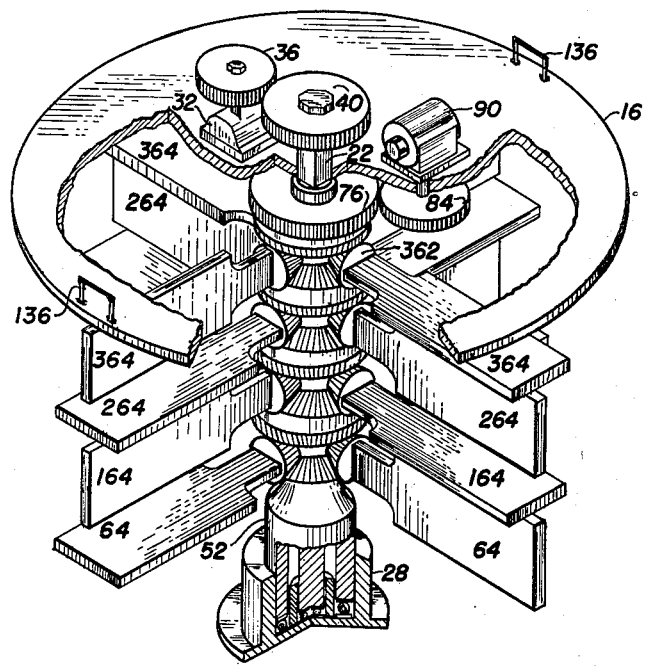
Figure 13 is an isometric view showing the device of this invention assembled as a portable unit.

From the description of the figures thus far, it is readily apparent that various equivalent mechanical arrangements may be used for certain portions of the apparatus within the scope of this invention. Gears 38 and 40 or 82 and 84 may be changed to belt or friction drives. Also, bevel gears may be used instead of spur gears for the drive mechanisms. Motors 32 and 90 may be electric, or gasoline motors. The bearings used throughout the apparatus may be simple sleeve bearings, roller bearings or ball bearings, depending on the type of service intended. The parts may be fabricated from metal, alloys or plastic. The device may be fitted with safety shields, and handles to make same readily portable, etc. As illustrated in Figure 13, cover member 16 may be equipped with handles 136 and trunnion 28 may be attached to the tank bottom (not shown) to support shaft 22. In Figure 14 there is shown a side view of another type of portable assembly wherein the gear, impeller and trunnion arrangement, shown in dotted lines, is supported between cover member 16 and the trunnion by means of yoke member 138. This bracket may be one continuous U-shaped piece or divided into two L-shaped arms and is attached at its upper ends to cover member 16 by means of a double bracket 140 through bolts 142. One motor may be used to drive both shaft 22 and ring gear 82 through a combination gear box in such portable devices as shown in Figures 13 and 14.

The mixing device of this invention has many possible modes of operation. By utilizing these modes of operation, the degree of agitation or stirring imparted to the materials to be treated in vessel 10 may be gradually increased or decreased at the will of the operator. It is seen that the following possibilities are readily available.

Motor 32 may be stopped while power is applied through motor 90. Assume shaft 86 and gear 84 are thereby rotated clockwise. This will rotate gear 82 counter-clockwise and rotate spur gears 362 and impeller blades 364 about their axles. Since shaft 22 is now fixed, collar 358 cannot move and impellers 364 turn in opposite directions as indicated by arrows 132. Under these conditions, impellers 364 will remain in one plane. This rotation of spur gears 362 will be imparted to double bevel gear 266 which will rotate opposite to collar 76 or clockwise, it being free to turn on shaft 22 by means of sleeve bearing 272. This rotation of double bevel gear 266 will in turn cause spur gears 262 to rotate on their axles, which rotation will be in the directions of arrows 134. Similarly, double bevel gear 166 will be rotated counter-clockwise; impellers 164 in the direction of arrows 144; double bevel gear 66 will rotate clockwise and impellers 64 in the direction of arrows 146. Adapter 52 will not rotate under any conditions and may be splined to trunnion 28.

Motor 90 may be reversed to change the directions of motion, just described, to the opposite of that shown in Figure 1.

With the foregoing motions underway, that is motor 88 driving gear 84 clockwise, the whole assembly may be slowly or quickly rotated in vessel 10 by means of motor 32. This action will result in a slowing down or a speeding up of the rotation of the impellers depending on the speed and direction of rotation of motor 32. If motor 32 rotates gear 36 clockwise, it is seen that, gear 40 and shaft 22 will rotate counter-clockwise. Shaft 22 carried collars 358, 258, 158 and 58. Accordingly, with gear 82 rotating counter-clockwise and collar 358 also rotating counter-clockwise with shaft 22, the axial rotation of the impellers will stop when the speeds of these two rotations become equal. As the speed of motor 32 is advanced beyond the speed of motor 90, then the relative motion between gear 82 and collar 358 will be reversed and impellers 364, 264, etc. will rotate in the opposite direction from arrows 132 and 134, etc. at a speed proportional to the degree of relative motion.

With gear 82 rotating counter-clockwise and motor 32 driving shaft 22 clockwise, the opposite effect will result, that is the relative motions between gear 82 and collar 358 will be increased and impellers 364, 264, etc. will speed up in the direction of the arrows 132, 134, etc. One skilled in the art will readily recognize the other possible motions that may be imparted to the impellers, that is with motor 90 stopped and motor 32 operating in either direction and at different speeds.

Figure 6:
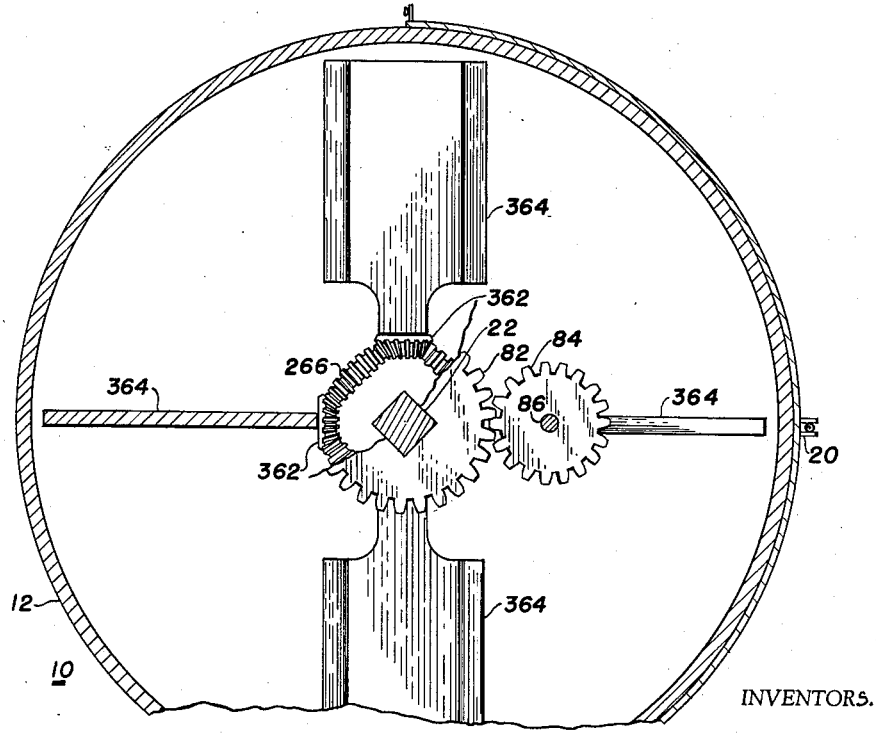
Figure 6 is a sectional view taken along lines 6—6 of Figure 5.

Various other modifications of the invention become apparent from the foregoing description. The impellers may be any shape or size and may have sharp or flat edges which are closely spaced from one another for greatest shear or widely spaced. One form of sharp edged impeller is shown by the shape of the impeller 64 in Figure 9. Another form is shown in Figure 6 by impellers 364. The number of impellers on each collar need not be the same as the remaining collars on the supporting shaft and any total number of impellers may be used. Thus the invention relates to the combination of parts shown without the impellers attached as well as the embodiments shown with a plurality of impellers. Accordingly, the combination may include only gear 76, collar 358, one spur gear 362, one impeller 364 supported thereon with adaptor 52 and trunnion 28. As another alternative, the topmost collar 358 may have only one impeller, the next collar, 258, may carry two impellers and the next collar 158 may carry three impellers, etc., along the series. Any combination of numbers and arrangements of impellers may be used. For least strain on the parts and longer life, it is preferred that at least two of the spur gears on each collar carry impellers and that these be oppositely positioned, that is, at 180° from each other. The impellers may be of any size desired and so located in relation to each other that at any one moment in their rotation they pass the next lower or upper impeller, on the same side position relative to the supporting shaft, with their edges coming in closest proximity as in Figure 12, or with the edge of one impeller approaching the side of the neighboring impellers as in Figures 3, 5, 11 and 13.

What is claimed is:

1. In a mixing device the combination of a rotatable supporting shaft, a series of spaced double faced ring gears rotatably mounted on said shaft, a series of collars non-rotatably mounted on said shaft, said collars rotatably supporting at least one epicyclic gear meshing with adjacent gear faces on said ring gears, and an impeller attached to said epicyclic gear.

2. In a mixing device a combination including a rotatable supporting shaft, means for rotating said shaft, a series of spaced double faced ring gears rotatably mounted on said shaft, a series of collars non-rotatably mounted on said shaft, said collars rotatably supporting at least one epicyclic gear meshing with adjacent gear faces on said ring gears, an impeller attached to said epicyclic gear and means for rotating one of said ring gears.

3. In a mixing device the combination of a rotatable supporting shaft within a process vessel, means for rotating said shaft, a series of spaced double ring gears rotatably mounted on said shaft, a series of collars on said shaft between said ring gears, said collars being non-rotatably mounted on said shaft, said collars rotatably supporting planetary gears meshing with adjacent gear faces of said ring gears, impellers attached to and extending from said planetary gears and means for rotatably supporting said shaft within said process vessel.

4. In a mixing device the combination of a rotatable supporting shaft within a process vessel, means for rotating said shaft, a series of spaced double ring gears rotatably mounted on said shaft, a series of collars on said shaft between adjacent ring gears, said collars being non-rotatably mounted on said shaft, said collars rotatably supporting planetary gears meshing with adjacent gear faces of said ring gears, impellers attached to and extending from said planetary gears, means for rotating the topmost of said ring gears in the series and means for rotatably supporting said shaft within said process vessel.

5. In a mixing device the combination of a rotatable supporting shaft within a process vessel, means for rotating said shaft in either direction, a series of spaced double ring gears rotatably mounted on said shaft between adjacent collars, said collars being non-rotatably mounted on said shaft, said collars carrying planetary gears independently and rotatably mounted on supporting axles extending from said collars, said planetary gears meshing with adjacent gear faces of said ring gears, impellers attached to and extending from said planetary gears, means for rotating the topmost of said ring gears in either direction, and means for rotatably supporting said shaft within said process vessel.

6. In a portable mixing device the combination including a supporting cover plate for a process vessel, a supporting shaft extending through said cover plate, means attached to said cover plate to rotate said shaft, arm means extending from said cover plate to rotatably support the extended end of said shaft, a series of spaced double faced ring gears rotatably mounted on said shaft, a series of collars non-rotatably mounted on said shaft, said collars rotatably supporting at least one epicyclic gear meshing with adjacent gear faces of each of said spaced ring gears, an impeller attached to said epicyclic gear and means for rotating one of said ring gears.

7. In a mixing device the combination of a rotatable supporting shaft, means for rotating said shaft, a series of spaced double faced ring gears rotatably mounted on said shaft, a series of collars non-rotatably mounted on said shaft, said collars in the series rotatably supporting at least one epicyclic gear meshing with adjacent gear faces on said spaced ring gears, an impeller attached to said epicyclic gears on alternate collars, and means for rotating one of said ring gears.

8. In a mixing device the combination of a rotatable supporting shaft, means for rotating said shaft in either direction and at variable speeds, a series of spaced double faced ring gears rotatably mounted on said shaft, a series of collars non-rotatably mounted on said shaft, said collars in the series rotatably supporting at least one epicyclic gear meshing with adjacent gear faces on said spaced ring gears, an impeller attached to said epicyclic gears on alternate collars and means for rotating one of said ring gears in either direction and at variable speeds.

9. A mixing device comprising a vessel to contain the materials to be mixed, a cover member for said vessel, a supporting shaft extending from said cover member into said vessel, means attached to said cover member for rotating said shaft, means on the bottom of said vessel to rotatably support said shaft, a series of spaced ring gears rotatably mounted on said shaft, said ring gears having bevel gear surfaces on opposite sides thereof, a collar member between each of said ring gears, said collar members being non-rotatably mounted on said shaft, a bevel spur gear rotatably mounted on an axle extending from said collars perpendicular to said supporting shaft, an impeller attached to and extending from the outer side of each of said bevel gears, said bevel gears engaging the opposed gear surfaces of adjacent ring gears to form an epicyclic gear train, whereby rotation of said shaft in a direction opposite to the direction of rotation of the topmost ring gear causes said impellers to rotate individually about their supporting axles and causes the entire assembly to rotate about said supporting shaft within said vessel.

10. In a mixing device the combination including a transverse support means, a yoke extending from said support means, a rotatable shaft supported between said support and said yoke, a series of spaced double faced ring gears rotatably mounted on said shaft, a series of collars non-rotatably mounted on said shaft, said collars rotatably supporting an epicyclic gear meshing with adjacent gear faces of each of said spaced ring gears, an impeller attached to said epicyclic gear and means for rotating one of said ring gears.

11. A mixing device comprising means to hold the materials to be mixed, a support means in association therewith, a rotatable shaft extending from said support means into the means to hold the materials to be mixed, a series of spaced ring gears rotatably mounted on said shaft, said ring gears having bevel gear surfaces on opposite sides thereof, a collar member non-rotatably mounted on said shaft between each of said ring gears, a plurality of individual axles extending from the periphery of said collar and normal to said shaft, a bevel spur gear rotatably mounted on said axles, an impeller attached to and extending from the outer side of each of said bevel spur gears, said bevel spur gears on a collar engaging the opposed gear surfaces of adjacent ring gears and means for attaching impeller blades to the outer side of said bevel spur gears.

12. A mixing device in accordance with claim 11 in which impeller blades are attached to said bevel spur gears.

13. A mixing device in accordance with claim 12 in which a collar without impellers is located between adjacent collars carrying impellers.

References Cited in the file of this patent

UNITED STATES PATENTS

| | | |
|---|---|---|
| 368,076 | Doelfel | Aug. 9, 1887 |
| 795,082 | Warner | July 18, 1905 |
| 1,298,651 | Boath | Apr. 1, 1919 |
| 2,774,253 | Minard et al. | Dec. 18, 1956 |

FOREIGN PATENTS

| | | |
|---|---|---|
| 2,236 | Great Britain | May 8, 1798 |